(12) United States Patent
Ferrari

(10) Patent No.: US 9,226,616 B2
(45) Date of Patent: Jan. 5, 2016

(54) FRYER WITH PERFORATED COVER

(71) Applicant: Luciano Ferrari, Latina (IT)

(72) Inventor: Luciano Ferrari, Latina (IT)

(73) Assignee: BY ME S.R.L., Latina (IT)

( * ) Notice: Subject to any disclaimer, the term of this patent is extended or adjusted under 35 U.S.C. 154(b) by 201 days.

(21) Appl. No.: 13/762,777

(22) Filed: Feb. 8, 2013

(65) Prior Publication Data

US 2013/0152800 A1    Jun. 20, 2013

Related U.S. Application Data

(63) Continuation of application No. PCT/IT2011/000293, filed on Aug. 9, 2011.

(30) Foreign Application Priority Data

Aug. 11, 2010    (IT) .............................. RM2010A0449

(51) Int. Cl.
 *A47J 37/12*    (2006.01)
 *A47J 36/38*    (2006.01)

(52) U.S. Cl.
 CPC ................ *A47J 37/128* (2013.01); *A47J 36/38* (2013.01); *A47J 37/1204* (2013.01); *A47J 37/1266* (2013.01)

(58) Field of Classification Search
 CPC ..... A47J 37/128; A47J 37/1204; A47J 36/38; A47J 27/58
 USPC ........... 99/403, 407, 410, 411, 412, 413, 414, 99/415; 126/384.1, 381.1
 See application file for complete search history.

(56) References Cited

U.S. PATENT DOCUMENTS

| | | | | |
|---|---|---|---|---|
| 4,091,956 | A | * | 5/1978 | Vecchio ......................... 220/231 |
| 4,482,077 | A | | 11/1984 | Henderson |
| 4,724,825 | A | * | 2/1988 | Fritsch et al. ............... 126/376.1 |
| 5,816,139 | A | * | 10/1998 | Scorta Paci ..................... 99/413 |
| 6,125,842 | A | * | 10/2000 | Loyd et al. ................. 126/386.1 |
| 7,098,427 | B2 | * | 8/2006 | Ducarme et al. .............. 219/437 |
| 2010/0000418 | A1 | * | 1/2010 | Payen et al. ..................... 99/341 |

FOREIGN PATENT DOCUMENTS

IT    1392954    4/2012
WO    WO 2010/086892 A1    8/2010

OTHER PUBLICATIONS

International Search Report issued in the International Application No. PCT/IT2011/000293 on Jan. 30, 2012.
EPO Search Report issued in the Italian Application No. RM2009A000046 on Jul. 6, 2011.
Examination Report issued in the Italian Application No. RM2009A000046 on Jul. 12, 2011.

* cited by examiner

*Primary Examiner* — Reginald L Alexander
(74) *Attorney, Agent, or Firm* — Hershkovitz & Associates, PLLC; Abraham Hershkovitz

(57) ABSTRACT

The present invention relates to a fryer (10) provided with a containing structure (11) inside which at least a frying basin (15) is present, which is filled with oil up to a preset maximum level, each frying basin (15) being provided with at least one drum (17) for containing the food to be fried, the fryer (10) further being provided with a perforated lid (20) comprising pass through holes (25, 27) for the passage of vapor and gas going upwards and of condensed vapor going downwards and means for cooling (21, 22, 23) and condensing vapor passing through said holes, and support means (16) of said vapor cooling means (21, 22, 23), characterized in that it further comprises means for adjusting the vapor flow (28).

4 Claims, 4 Drawing Sheets

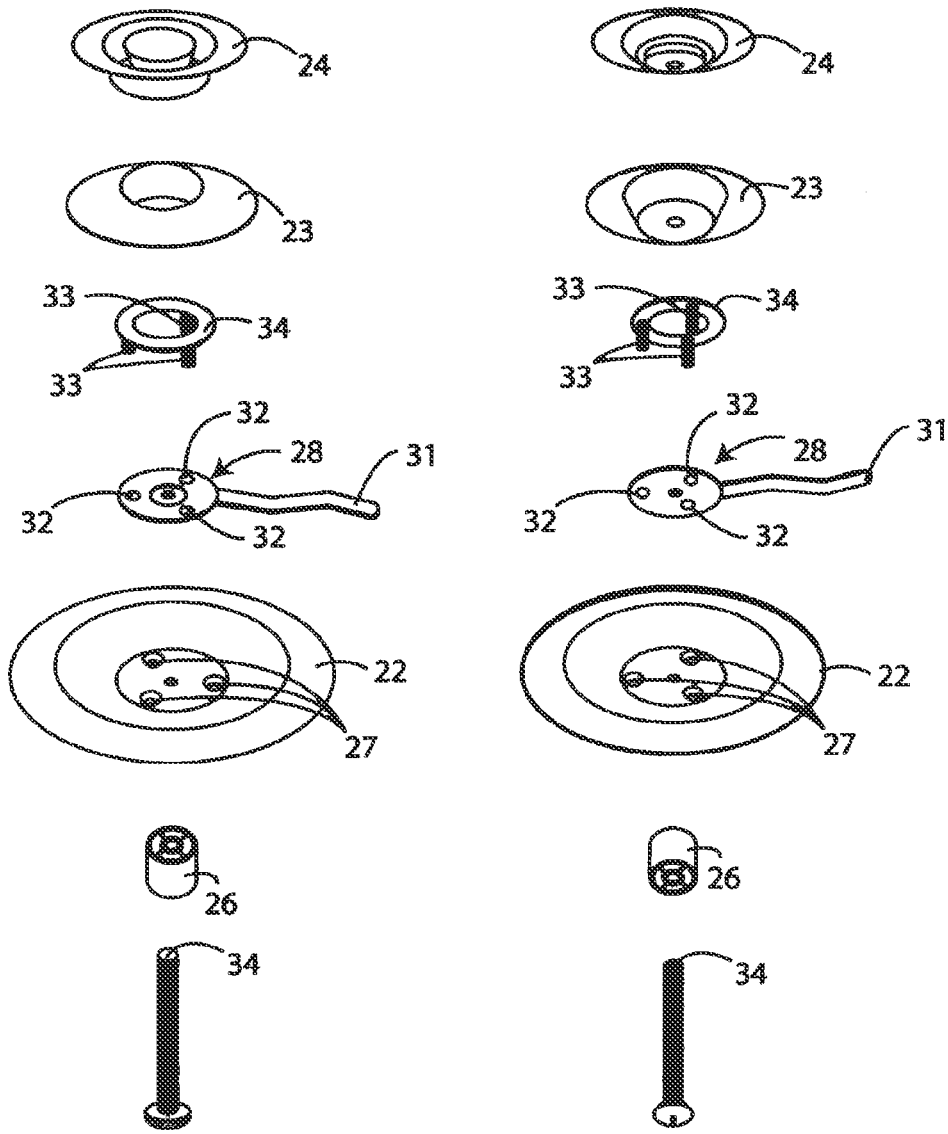

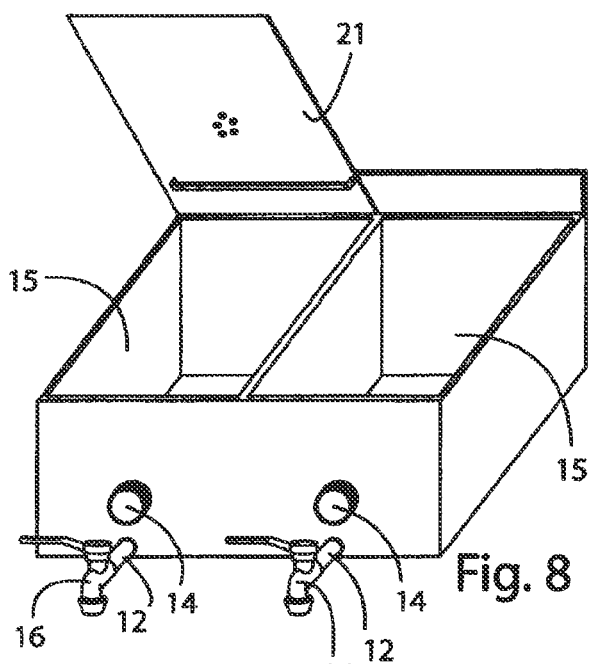
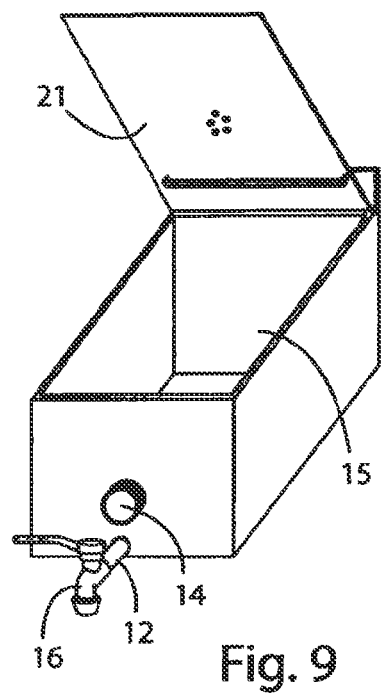
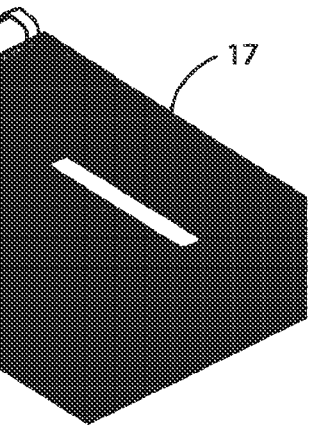
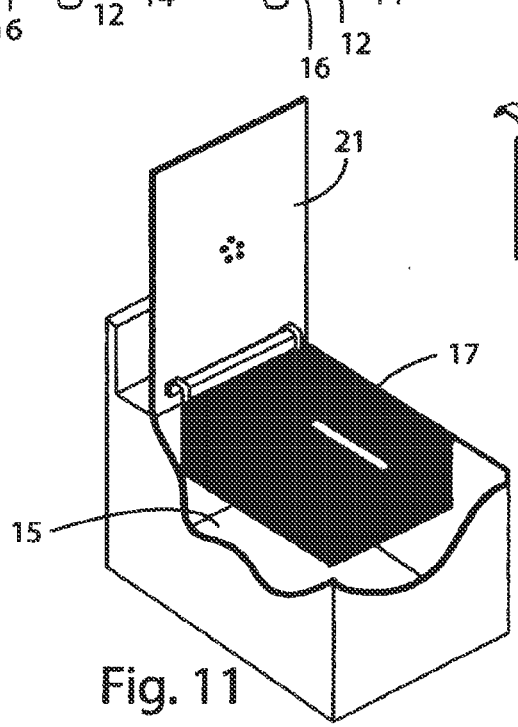
Fig. 8
Fig. 9
Fig. 10
Fig. 11

FRYER WITH PERFORATED COVER

The present invention relates to a fryer with perforated cover, particularly provided with means for adjusting the condensation grade of vapor flow exiting through the cover holes.

More specifically, the invention concerns a fryer of the above kind, particularly studied and realized to be able to recover nutritional properties of fried food, and to permit obtaining a crispier frying.

As it is well known, fryers are usually comprised of a basin within which frying oil is introduced. Foodstuff to be fried are introduced within oil, preferably after having set within a suitable collection gasket, furthermore, fryers are usually provided with a cover permitting reducing fry odors, particularly if not provided with anti-odor filter, usually placed under the cover, with a thermostat, permitting controlling frying oil temperature, and with a cock for discharging used oil.

Italian patent application no RM2009A000046, in the name of Opinion Leaders, describes a perforated cover for containers for cooking foodstuffs, comprising holes for passage of vapor and gas generated while cooking the foodstuff, rising upward and for condensate going downward, and cooling and condensation means of vapor passing through said holes, and support means for said vapor cooling means, wherein vapor cooling means are comprised, in succession, starting from cooking container and going upward, by a perforated lower plate, at least a perforated intermediate plate and a not-perforated upper plate, and said support means for said vapor cooling means being comprised of lower spacing means, between said lower plate and said intermediate plate, and of upper spacing means, between said intermediate plate and said upper plate, as well as fryer for using said perforated cover.

Object of the cover and of the fryer according to said patent application is that of preventing that foodstuffs can be cooked at a too high temperature, thus avoiding that they can degrade losing their organoleptic properties, and at the same time overcoming limitations of known solutions that, providing relief holes for saturated vapor, preferred cooking foodstuffs at low temperature, with uniform distribution of heat within the pan, thus permitting recovering vapor phase transformed into liquid state, so avoiding that foodstuff arrives at more than 100° C., preventing degrade of vitamin, protein and lipid components, reducing energy needs, but had the drawback that, since cooking by said covers vapor exits from cooking container at a set pressure, thus not being able preventing dispersing into environment nutritive properties of the foodstuff. Said drawback occurs notwithstanding the fact that said covers have been improved providing, above saturated vapor relief holes, and at a set distance from the same, a vapor collection and condensation belt that, at the same time did not prevent passage outward of gas.

This king of improved covers further had the problem of a progressive heating of vapor collection and condensation bell, with consequence that amount of vapor condensed and returned to the cooking container was always more less with respect to the amount necessary to the desired cooking features.

According to Italian Patent Application RM2009A000046, it was suggested a cover permitting obtaining a cooking of foodstuffs without degradation of quality of same foods and permitting cooking at not too high temperatures, also realizing a thermal insulation of foodstuffs with respect to surrounding environment, permitting increasing amount of condensate vapor re-entering within cooking container and at the same time maintaining the same amount of vapor and gas exiting from the same container.

Said type of cover permits reaching particularly positive results in case of frying. In fact, while traditional fries within closed fryers reach temperatures even higher than 200° C., with consequent formation of toxic products while cooking, thanks to the improved cover according to the above Italian Patent Application RM2009A000046 it is possible frying at a temperature of 97° C., well under 180° C. which is the temperature at which oil transforms into acrolein, a carcinogenic substance, but even under 140° C. at which oil reaches smoke point, producing first toxic substances. Further, condensate vapor recirculation permits transforming cooking container on which cover has been placed into a ventilated and vapor cooled oven, with consequent advantages. Further, not reaching degradation temperature while cooking, oil maintains its organoleptic properties and can be used for further cookings, up to 50 consecutive hours of frying. Not only, since when it does not decompose while frying, oil can be more easily disposed off.

On the contrary, a crispy frying not only requires that temperature control is perfect while cooking, but also that, at the end of the cooking, a set amount of water is poured on frying oil.

In this panorama is included the solution according to the present invention, suggesting providing a fryer with a perforated cover, having means permitting adjusting amount of vapor condensed and re-circulated within the fryer.

Object of the present invention is that of realizing a fryer permitting overcoming limitations of known solutions and to obtain the above technical results.

Further object of the present invention is that said fryer can be realized at low manufacturing and handling costs.

Least, but not last, object of the invention is that of realizing a substantially simple, safe and reliable fryer.

It is therefore specific object of the present invention a fryer provided with a containing structure inside which at least a frying basin is present, which is filled with oil up to a preset maximum level, each frying basin being provided with at least one drum for containing the food to be fried, the fryer further being provided with a perforated lid comprising pass through holes for the passage of vapour and gas going upwards and of condensed vapour going downwards and means for cooling and condensing vapour passing through said holes, and support means of said vapour cooling means, characterised in that it further comprises means for adjusting the vapour flow.

Preferably, according to the invention, depth of said at least one frying basin is such to allow for the presence of a vapour collection chamber above the maximum level of the oil for frying.

Particularly, according to the present invention, said vapour cooling means are comprised of, in sequence, starting from the frying basin and proceeding upwards, a perforated lower plate, at least one perforated intermediate plate and a non perforated upper plate, and said support means of said vapour cooling means are comprised of a spacing element, interposed between said lower plate and said intermediate plate.

Still according to the invention, said means for adjusting the vapour flow comprise a flow regulating element, manually operated by means of a handle.

Preferably, according to the invention, said flow regulating element comprises a disc rotatably mounted on said intermediate plate and a plurality of protrusions, the number, position and dimensions of which are such to allow, in a first position of said flow regulating element, the closing at the same time of all the holes of the intermediate plate and, in a second position, the spacing of said disc out from said intermediate plate.

Finally, always according to the present invention, that said lower plate has an upward facing concave surface and comprises a plurality of holes, arranged so to form one or more circles, in correspondence of each of them an intermediate plate and an upper plate being applied in sequence together with the relative support means and vapour flow regulating means.

The present invention will be now described, for illustrative, but not limitative, purposes, according to its preferred embodiments, with particular reference to the figures of the enclosed drawings, wherein:

FIG. 6 shows a top exploded perspective view of condensation elements of cover of fryer according to FIG. 1;

FIG. 7 shows a bottom exploded perspective view of condensation elements of cover of fryer according to FIG. 1;

FIG. 8 shows a top perspective view of basin system of a two-basin fryer according to the present invention;

FIG. 9 shows a top perspective view of basin system of a single-basin fryer according to the present invention;

FIG. 10 shows a top perspective view of a basket of a fryer according to the present invention; and FIG. 11 shows a top perspective view of a fryer according to the present invention, open.

Figure 1:
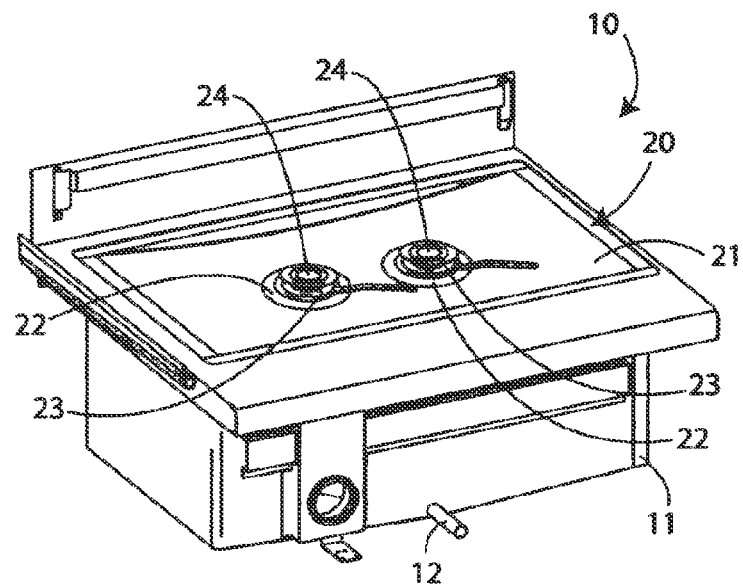
FIG. 1 shows a perspective view of a fryer according to a first embodiment of the present invention.
Figure 2:
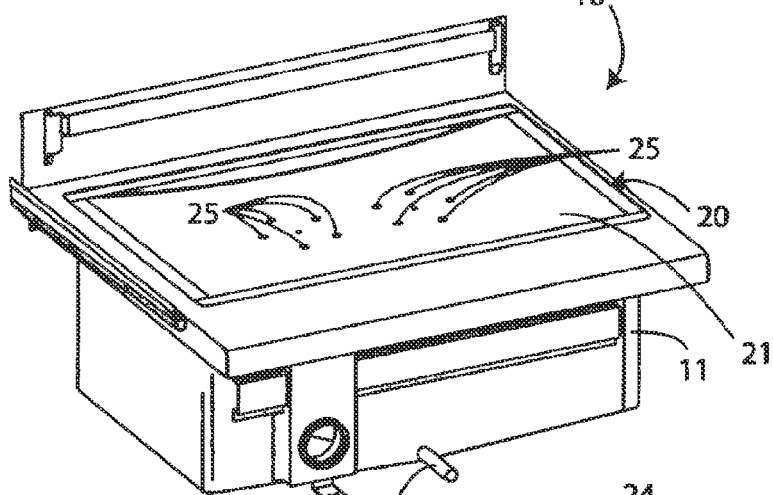
FIG. 2 shows a perspective view of fryer of FIG. 1, without cover condensation elements.

Making reference to FIGS. 1 and 2, a fryer according to the invention, generically indicated by reference number 10, is comprised of a containment structure 11, within which a frying basin (not shown) is present, covered by a cover 20. Said basin has such a depth to permit containing the same amount of oil of a traditional basin, but with a larger area above the oil level. According to the objects of the present invention, it is in fact important that space between above oil level and under the fryer cover is such that accumulation of an amount of vapour higher than the amount accumulated in traditional fryers. For example, with a distance of 7 cm usually present between maximum oil level and cover, according to the present invention it is preferred that said distance is between 8 and 23 cm.

Fryer is further provided with a discharge duct 12.

Cover is comprised of a lower plate 21, comprising the element provided above the cooking basin, on which an intermediate plate 22, an upper plate 23 and a handle 24 are provided.

Figure 3:
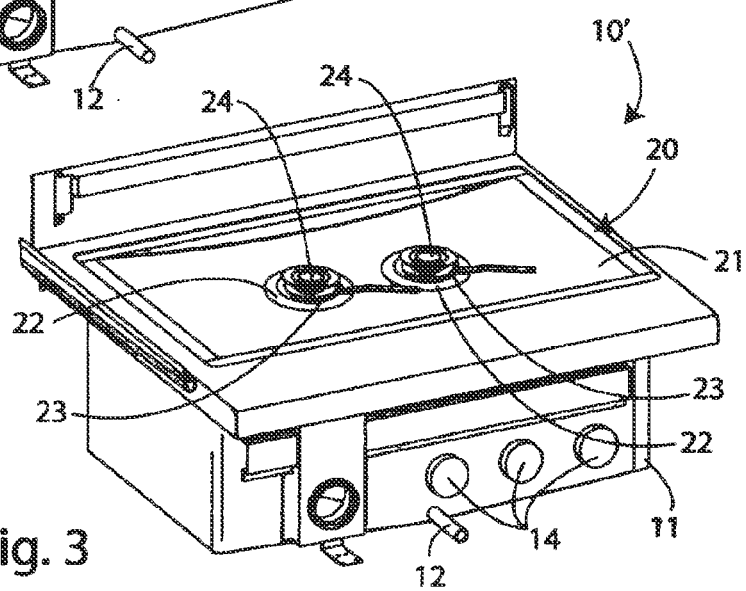
FIG. 3 shows a perspective view of a fryer according to a first embodiment of the present invention.

FIG. 3 shows a fryer according a second embodiment of the present invention, indicated by reference number 10', comprised of a containment structure 11, within which three frying basins are present (not shown), provided with thermostats and relevant adjustment monopole 14, covered by a single cover 20.

Figure 4:
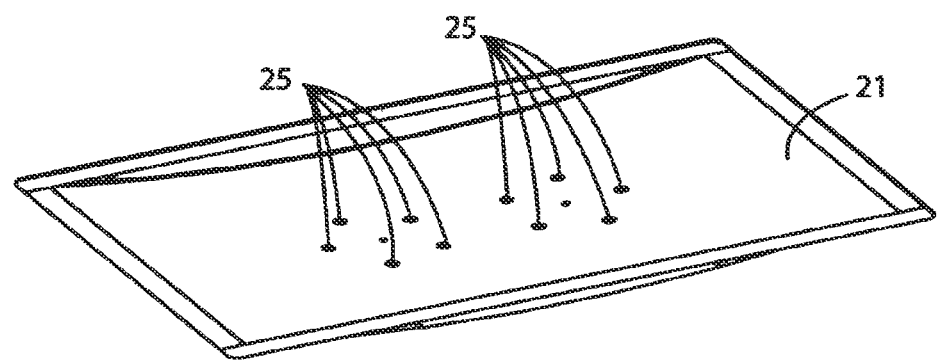
FIG. 4 shows a perspective top view of lower plate of cover of fryer according to FIG. 1.
Figure 5:
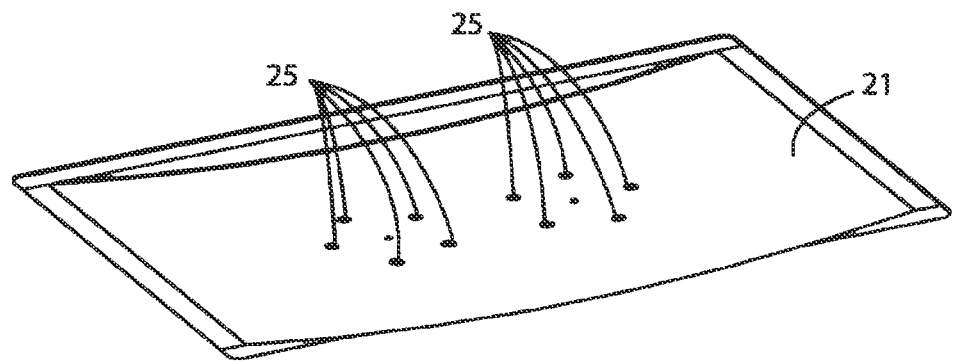
FIG. 5 shows a bottom perspective view of lower plate of cover of fryer according to FIG. 1.

Making reference to FIGS. 4 and 5, lower plate 21 provides a cured shape, so as to have a downward convex lower surface, i.e. toward the cooking basin. Two groups of holes 25 are realised close to the centre of lower plate 21, the shape of which creates passage channels for vapour and gas exiting from cooking container and for condensate vapour returning within cooking container. Said holes 25 have a suitable diameter, and their positioning on lower plate 21 realises, in this embodiment, two circumferences having relevant centres symmetrically provided with respect to the centre of the lower plate 21.

Making reference to FIGS. 6 and 7, they are shown in an exploded view, elements of cover 20 mounted above lower plate 21. First one of said elements is the intermediate plate 22, mounted above the lower plate 21 by a lower spacing element 26, made up of insulating material. According to the invention, saturated vapours produced within the fryer basin pass through holes 25 of the lower plate 21, being subjected to an acceleration outward the cooking container. Said saturated vapours exiting from holes 25 meet lower surface of the intermediate plate 22, and contacting the same, which is at a lower temperature, are subjected to a partial condensation and fall down by gravity, passing through the same holes 25 and re-entering within the cooking container.

Lower surface of the intermediate plate 22 has a suitable concave shape so that condensate created by said vapours accumulates on lower surface and a larger amount falls down on upper surface of lower plate 21. Upward concave shape of lower plate 21 promotes collection of condensate and outflow of liquid substances within the cooking container, by said holes 25.

Lower surface of intermediate plate 22 can further have an undulated profile so as to increase surface met by saturated vapour, thus increasing condensation caused by intermediate plate 22.

Furthermore, intermediate plate 22 provides holes 27, close to the centre, the shape of which creates channels for passage of vapour and gas arriving from lower plate 21 and for condensed vapour falling down on the lower plate 21.

Upper plate 23 is mounted above intermediate plate 22, with interposition of a flow adjustment element 28, and a handle 24 is mounted above said plate 23.

Flow adjustment element 28 is comprised of a disc 29, provided with lower projections 30, the position, the number and dimensions of which are such to correspond to holes 27 of intermediate plate 22, so that, suitably rotating flow adjustment element 28, each hole 27 of intermediate plate 22 is closed by a corresponding protrusion of flow adjustment element 28. Flow adjustment element is further provided with a handle 31, having a lever shape radially extending with respect to the disc 29. A plurality of housings 32 for a corresponding number of springs 33 is present on the upper surface of disc 29, said springs being supported by a ring 34. Function of said springs and of said ring is that of permitting a free rotation of flow adjustment element 28 with respect to intermediate plate 22, and at the same time ensuring sealing of coupling between flow adjustment element 28 and intermediate plate 22.

Lower surface of upper plate 23 is downward concave to promote accumulation of condensate created by vapours contacting the upper plate 23, which is at a temperature lower than the one of intermediate plate 22. In fact, by closing holes 27 by said flow adjustment element 28, almost for all the time of frying, upper plate 23 does not contact hot vapour exiting from fryer. At the end of cooking, flow adjustment element 28 is rotated, thus permitting passage of vapour, and the latter contacts lower surface of upper plate 23, which is cooler and promotes a higher condensation of vapour. Thus, a larger amount of condensate accumulates and falls down on intermediate plate 22. Further, upper surface of intermediate plate 22 is upward concave, to promote collection of condensate and outflow of liquid substances downward through holes 27.

Lower surface of upper plate 23 can further have an undulated profile so as to increase surface met by saturated vapour increasing condensate effect of upper plate 23.

Diameter of upper plate 23 is lower than diameter of intermediate plate 22, to permit upper plate 23 deviating vapour exiting from relevant holes 27 of intermediate plates 22 without stopping its flowing.

Lower spacing element 26 and flow adjustment element 28 are respectively connected with said lower plate 21 and with said intermediate plate 22 and with said upper plate 23 by a screw 34 passing through a central hole on said plates 22 and 23 and passing through said spacing element 26 and said flow adjustment element 28.

On the basis of the above specification, it can be observed that basic feature of perforated cover of fryer according to the present invention is presence of three juxtaposed plates, wherein lower plate 21 and intermediate plate 22 are provided with holes 25, 27 for passage of vapours and gas respectively arriving from frying basin and lower plate 21, and rising upward, and of condensate descending downward and wherein intermediate plate 22 and upper plate 23 are provided with a downward concave lower surface for condensation and accumulation of vapour contacting said surface.

An advantage of the present invention is that of providing a second condensation plate, above the first condensation plate, to which vapour can arrive according to the position of flow adjustment element 28 and is at a temperature lower than the first plate. On lower surface of said upper plate 23 it is obtained a vapour balancing permitting condensation and consequent recovery of more vapour.

Making now particular reference to FIGS. 8 and 9, fryer 10 according to the present invention can comprise two or one frying basin 15 (and also eight independent frying basins), each basin 15 being provided with monopole 14 for adjusting temperature of a thermostat. Each basin 15 is further provided with a discharge duct 12, provided with a cock 16.

A further relevant aspect to ensure a perfect frying is that of ensuring sealing of the cover 20 and to make that it perfectly adheres to the upper edge of frying basin 15.

Making reference to FIGS. 10 and 11, it is shown a basket 17, and its positioning with respect to basin 15 and lower plate 21 of said cover. Obviously, each basin can be suitable to receive more than one basket 17.

Furthermore, fryer 10 can be provided with a timer for measuring cooking time, as well a timer, starting only when the operative temperature is reached, to track total usage time of fryer.

Advantages of fryer according to the invention are well evident, permitting obtaining all set results, frying at a temperature of only 97° C., oil maintaining its organoleptic properties and being it possible using the same for further following cookings, up to 50 consecutive frying hours and being it easier disposing it, but ensuring a simple, reliable and safe way of making a crispy frying. Furthermore, fryer according to the invention permits a remarkable saving of cooking energy and permits frying at the same time different foodstuffs without mixing and modifying each other their organoleptic properties.

Present invention has been described, for illustrative, but not limitative purposes, according to its preferred embodiments, but it is to be understood that variations and/or modifications can be made by those skilled in the art without departing from the relevant scope as defined in the enclosed claims.

The invention claimed is:

1. A fryer comprising:
   a containing structure inside which there is provided at least one frying basin;
   said at least one frying basin being filled with oil up to a preset maximum level;
   said at least one frying basin being provided with at least one drum for containing food to be fried;
   the fryer being further provided with a perforated lid, said perforated lid comprising pass through holes for passage of vapour and gas going upwardly and of condensed vapour going downwardly;
   means for cooling and condensing vapour passing through said holes;
   support means for said means for cooling and condensing vapour;
   an intermediate plate which includes a plurality of holes;
   a vapour flow regulating element including a disc rotatably mounted on said intermediate plate and a plurality of protrusions, the number, position and dimensions of which are such as to allow, in a first position of said vapour flow regulating element, the closing at the same time of all of the plurality holes of the intermediate plate and, in a second position, the spacing of said disc from said intermediate plate, said vapour flow regulating element being provided with a handle;
   wherein said means for cooling and condensing vapour are comprised of, in sequence, starting from the at least one frying basin and proceeding upwardly, a perforated lower plate, at least one perforated intermediate plate and a non-perforated upper plate; and
   said support means for said means for cooling and condensing vapour include a spacing element interposed between said perforated lower plate and said perforated intermediate plate.

2. The fryer according to claim 1, wherein said perforated lower plate has an upwardly facing concave surface and includes a plurality of holes arranged so as to form one or more circles, said at least one intermediate plate and said upper plate being applied in sequence together with the respective support means and said vapour flow regulating element.

3. The fryer according to claim 1, wherein the depth of said at least one frying basin is such as to allow for the presence of a vapour collection chamber above a maximum level of oil for frying.

4. The fryer according to claim 2, wherein the depth of said at least one frying basin is such as to allow for the presence of a vapour collection chamber above a maximum level of oil for frying.

* * * * *